United States Patent [19]

O'Brien et al.

[11] 4,438,884

[45] Mar. 27, 1984

[54] QUICK DISCONNECT NOZZLE

[75] Inventors: Edward J. O'Brien, Barrington; Gary A. Paulsen, Geneva; Daniel J. Filicicchia, Aurora, all of Ill.

[73] Assignee: Spraying Systems Company, Wheaton, Ill.

[21] Appl. No.: 317,199

[22] Filed: Nov. 2, 1981

[51] Int. Cl.³ .............................................. B05B 15/00
[52] U.S. Cl. ..................................... 239/600; 285/376
[58] Field of Search .............. 285/401, 402, 376, 360, 285/361; 239/600; 277/207 A, 27, 3

[56] References Cited

U.S. PATENT DOCUMENTS

| 1,194,793 | 8/1916 | Styers | 285/376 X |
| 1,589,469 | 6/1926 | Homand | 285/376 X |
| 1,890,011 | 12/1932 | Wirz et al. | 285/376 X |
| 4,185,781 | 1/1980 | O'Brien | 239/600 |

Primary Examiner—Andres Kashnikow
Attorney, Agent, or Firm—Leydig, Voit, Osann, Mayer & Holt, Ltd.

[57] ABSTRACT

The invention comprises a quick disconnect nozzle including a nozzle body and a nozzle tip, wherein the nozzle body may be connected to a source of fluid and the nozzle tip is separable from the body by a single twist type action, yet the nozzle may be securely locked in the body by an interlocking engagement between the nozzle and body that is engaged and disengaged by relative twisting of the two parts. The locking action is obtained by the engagement of cooperative elements on the two parts including oppositely disposed undercut shoulders on the nozzle body and a pair of rounded projections on the nozzle tip which are engaged under the opposing shoulders by the relative twisting action. The interlocked relationship is maintained by a combination sealing member and pressure device that effectively seals the connection between the nozzle body and tip and exerts pressure therebetween to secure the locked connection.

7 Claims, 7 Drawing Figures

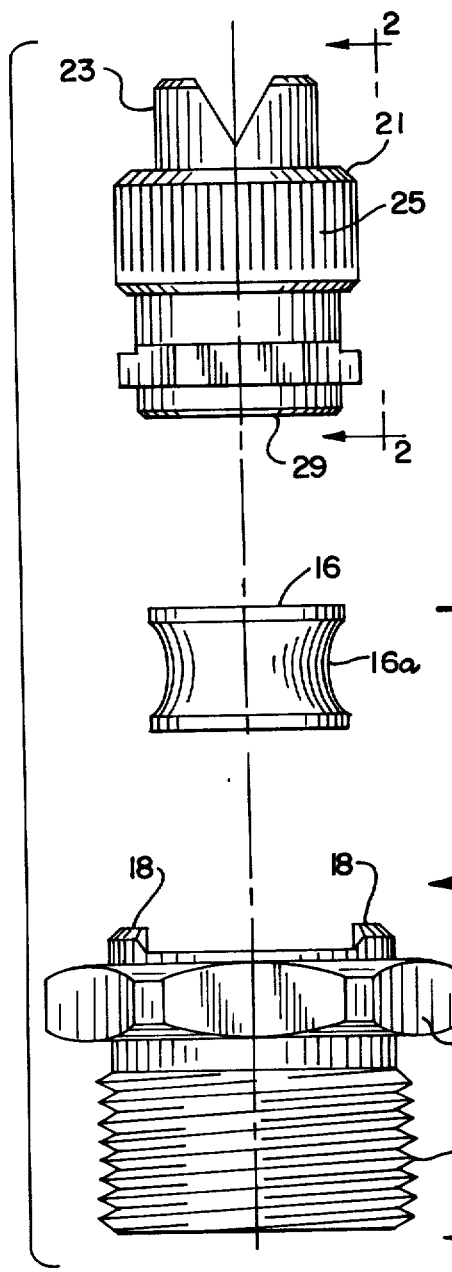
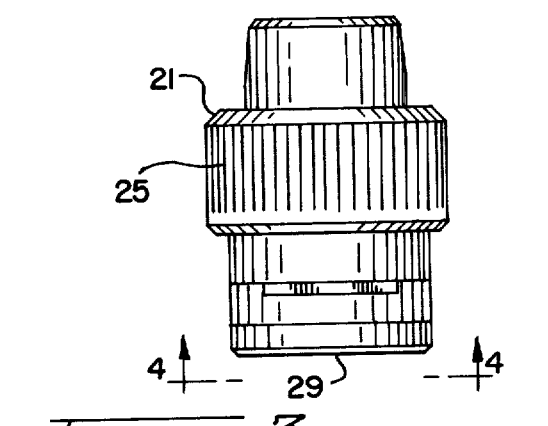
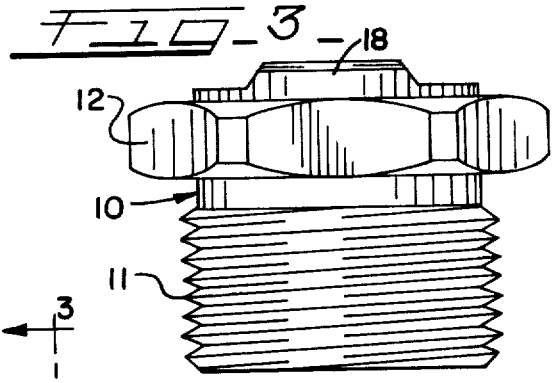
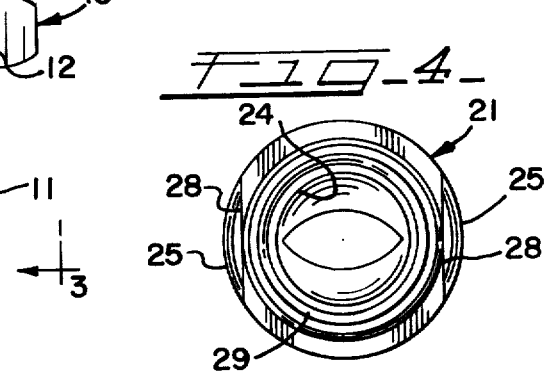

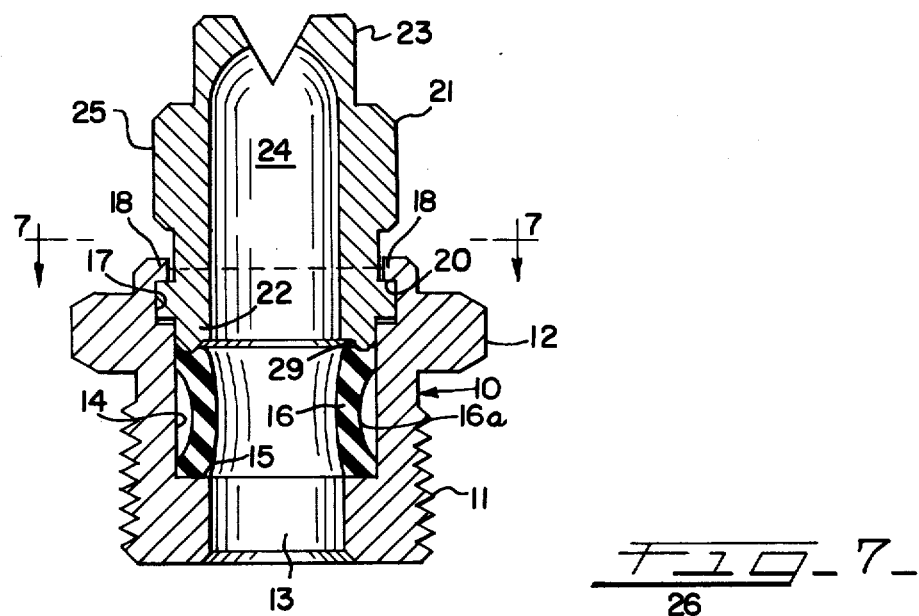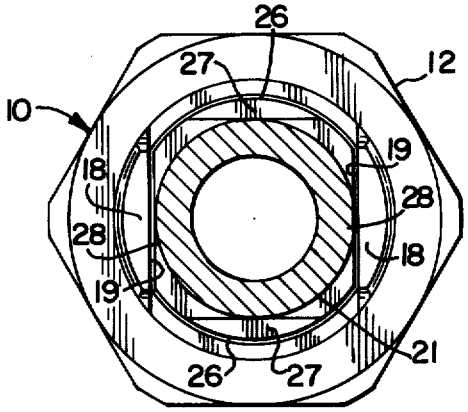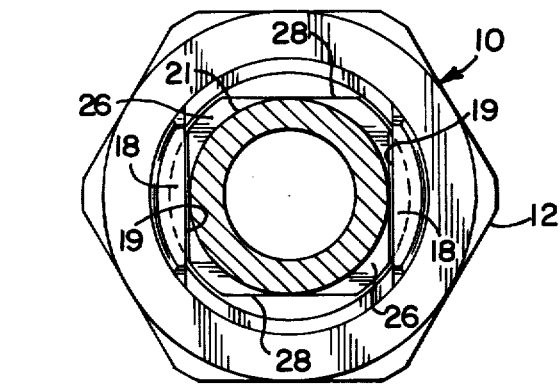

QUICK DISCONNECT NOZZLE

BACKGROUND OF THE INVENTION

The invention relates generally to a type of quick disconnect connection between a nozzle body and nozzle tip, wherein the connection affords a very precise angular relationship of the tip relative to the body.

It is often necessary to remove and/or change the tip of a spray nozzle for various reasons, such as inspection of the parts and cleaning if required because of stoppage, or clogging, or any other type of blockage. The nozzle tip may be replaced, or a different type substituted for a different type of spraying operation.

The usual threaded type connection utilized with spraying apparatus between a nozzle body and a spraying tip is subject to obvious limitations. When a non-axial spray direction is used, the threaded connection requires adjustment of the direction each time the nozzle is removed. Some spraying apparatus is not stationary and this requires that tools be provided at all of the various locations where the apparatus may be used, or otherwise transported with the apparatus to the site. Just the operation of removing and reapplying a threaded connection is unduly time consuming, especially where the spraying apparatus may have multiple nozzles.

Quick disconnect nozzles have been provided in the prior such as U.S. Pat. No. 4,185,781 wherein a separate seal member was provided and a separate pressure applying spring also included. Early patent to Molesta et al U.S. Pat. No. 1,177,884 discloses a two part spray nozzle but this disclosure utilized a lead ring sealing member. Australian Patent No. 255,921 disclosed a bayonet coupling in a hose connecting device which utilized what was intended to be a secure connection between the two parts that involved the use of two pegs on one member straddling the engaged surface on the other member.

In other types of prior nozzles additional parts were required in order to couple the nozzle tip with the nozzle body and such coupling components resulted in a significant loss of time just in handling the multiple parts and especially where, as often happened, some of the parts may have been lost, or misplaced during disassembly, or as the parts were attempted to be reassembled. These problems were especially acute where the spraying apparatus was of the mobile type. Some quick disconnect nozzles relied upon frictional engagement of the spray tip with the nozzle body and this necessitated very precise machining, or molding tolerances in the manufacture of such parts. This type of engagement was also undesirable for non-axial spraying directions inasmuch as the spray tip had to be adjusted for the proper direction each time such nozzles were assembled, or disassembled.

Some quick disconnect nozzle arrangements from the prior art did not afford effective immunity from vibratory effects, nor from the pressure surges that commonly occur in many spraying systems.

SUMMARY OF THE INVENTION

This quick disconnect spray nozzle connection is comprised of a spray tip and a nozzle body and a combination seal and pressure exerting member between the body and the nozzle tip. The combination pressure exerting seal member is resilient and is mounted in the nozzle body concentric with the nozzle bore and when the nozzle tip is mounted in the body a sealing ring on the tip abuts an end of the seal member around the bore, thus providing a seal between the parts and also compressing the seal member, whereby pressure is applied between the nozzle body and the tip to maintain the locked condition of the tip in the body.

The combination member thus eliminates any need for a separate spring and a separate sealing member and the single member functions both as a seal and as a spring, or pressure exerting member, to provide substantial advantages over earlier nozzles using the separate spring and separate seal. In addition to acting as a seal between the nozzle body and the spray tip the present sealing member acts also to seal the assembly against the entry of contaminants such as sand or other abrasive materials between the tip and the body housing which would cause excessive wear and possibly destroy the sealing properties of the seal member.

The quick disconnect nozzle includes a spraying tip having a cylindrical inlet stem at one end and a spray head at the other end with an interior fluid passage extending through the tip from the inlet of the stem to the spray head. A locking arrangement is disposed on the stem including arcuate sections extending radially outwardly of the stem and each section having a recess therein. The quick disconnect nozzle also is provided with a nozzle body that is adapted for connection to a source of fluid and includes an interior fluid passage extending therethrough and communicating with the fluid passage through the tip.

The nozzle body includes a first chamber having a stop surface forming a shoulder, or seat, extending inwardly of the chamber and which chamber is adapted to receive a portion of the spraying tip stem extending into the chamber. A second chamber is provided in the nozzle body and this chamber is of greater diameter than the first chamber in order to accommodate the arcuate sections of the locking members on the stem. These locking members are received in the second chamber and the chamber is cylindrical in order for the locking members to rotate freely therein.

This second chamber includes a pair of retention members extending radially inward of this chamber along a diameter thereof and which are disposed to engage the corresponding recesses in the arcuate locking sections. These arcuate sections are insertable into the nozzle body to a first position past the opposite retention members into the second chamber where the members are fully rotatable in this chamber and in a manner such that the recesses on the arcuate sections of the stem do not engage the retention members.

The resilient combination seal member is disposed in the first chamber of the nozzle body and abuts against the shoulder forming stop surface extending inwardly of this chamber and thus seated at its lower end is engageable at its opposite end with the lower end of the inlet stem to simultaneously provide a sealing function and a biasing function to exert pressure between the nozzle body and the inlet stem of the nozzle tip to provide a positive seal against the entry of contaminants between the outer periphery of the stem and the wall of the first chamber. The resilient seal member also biases the spraying tip into a second position where the recesses in the arcuate sections mate with and engage the opposing retention members in the second chamber whereby the arcuate section recesses and the opposing retention members are locked in a precise angular relationship.

DESCRIPTION OF THE DRAWINGS

The structure illustrated in the accompanying drawings provides an arrangement that functions as described and wherein FIG. 1 is an exploded view of the nozzle body with the combination resilient seal member disposed between the body and the spray tip with the three parts shown in elevation;

FIG. 2 is an elevational view of the spray tip revealing one of the recesses on an arcuate section;

FIG. 3 is a corresponding elevational view of the nozzle body with the retention member disposed to be engaged with the recess shown in FIG. 2;

FIG. 4 is a bottom plan view of the spray tip showing the parallel side portions that pass through similarly parallel opposed surfaces on the body member and which are associated with the retention members;

FIG. 5 is a vertical cross sectional view through the assembled nozzle body and spray tip with the combination seal member resiliently engaged between the body and tip;

FIG. 6 is a horizontal cross sectional view taken on the line 6—6 of FIG. 5 showing the nozzle body and stem in locked condition with the arcuate section recesses engaged under the retention members of the nozzle body; and FIG. 7 is a similar cross sectional view but illustrating the parts in unlocked condition.

DESCRIPTION OF PREFERRED EMBODIMENT

The parts of this quick disconnect nozzle assembly are best illustrated in FIG. 1, where the three parts are shown separately. The nozzle body 10 is threaded as at 11, whereby the nozzle may be connected to a source of fluid and a hexagonal portion 12 enables a suitable wrench to be applied for this prupose and enables such connection to be tightened, as required. As shown in FIG. 5, the nozzle body has an interior fluid passage 13 that extends therethrough.

A first chamber 14 in the body 10 includes a stop surface 15, extending inwardly of the chamber in the form of a shoulder, or seat and a resilient combination biasing and sealing member 16 is disposed in this chamber and has its lower end abutted against this seat.

A second chamber 17 is disposed in the nozzle body above the first chamber and is cylindrical and of larger diameter than the first chamber for a purpose hereinafter to appear. Adjacent the upper limit of this cylindrical chamber 17 a pair of opposed retention members 18 extend radially inward of the second chamber and have straight parallel inner sides 19 so that the members 18 provide overlying stops, or shoulders 20 that are disposed downwardly to react against upward movement.

The spraying tip 21 of the nozzle has a cylindrical inlet stem 22 at one end and a spray head 23 on the other end and an interior fluid passage 24 extends through the tip from the inlet of the stem to the spray head. An outer circular section 25 around the spraying tip is knurled for manipulating the tip 21 in the nozzle body 10 in assembling and disassembling the parts. The stem 22 extends with at least a portion thereof received in the first chamber 14 of the nozzle body and a locking means is disposed on the stem comprised of arcuate sections 26 extending radially outwardly from the surface of the stem at opposite sides of the stem.

A recess 27 is defined in each of the radially outwardly disposed arcuate sections 26 and as best shown in FIG. 7, this recess extends tangentially to the outer curves surface of the stem 22 and is substantially coincident with the outer diameter of the stem. As shown in FIG. 6, this recess is disposed under the overlying shoulder 20 formed by the retention member 18, when locked.

On the remaining two sides of the stem 22 flat surfaces 28 are provided substantially coincident with the outside diameter of the stem and by comparing FIGS. 6 and 7, it will be seen that the straight sides 28 are disposed parallel to the straight inner sides 19 of the retention members 18 whereby in this position clearance is provided for entrance of the stem into the nozzle body 10. The remaining perimeter of the stem, being circular, readily enters the cylindrical second chamber 17, as can be seen in FIG. 7.

With the stem 22 and nozzle body 10 disposed in the relationship illustrated in FIG. 7, it is necessary to press the stem into the body against the biasing action of the resilient seal member 16. This combination biasing sealing member 16 is engaged by the bottom end of the stem 22 and to provide an effective sealing action the lower side of the stem is provided with a concentric sealing ring 29 that presses into the top surface the resilient seal 16 to not only obtain an effective sealing action but also, due to the resilience of the combination member 16, a pressure is built up in the resilient member that effects a biasing action which is exerted between the seat 15 and the bottom end of the stem 22 so that the two parts are securely maintained in their locked position. This occurs as inward pressure on the spray tip 21 is released after assembly and the resilient seal member reacts to restore itself to normal condition and applies upward pressure on the stem 22.

The outer periphery of the resilient seal member 16 is hollowed out, as at 16$^a$, so that the configuration of the seal is somewhat in the shape of an hourglass, whereby the seal has greater flexibility, or resilience, so that when the stem 22 is pressed inwardly against the top end of the seal, the seal more readily flexes in response to the pressure applied and bulges inwardly toward its axis, as shown in FIG. 5, thereby adapting to the compressive force. This construction of the seal 16 also facilitates restoration of the resilient member to normal condition when the compressive force is released and insures the desired biasing action between the nozzle body 10 and the stem 22.

When disassembling the nozzle parts 10 and 21, it is merely necessary to press the stem 22 into the nozzle body against the resistance of the resilient seal 16 sufficiently to enable the arcuate sections 26 to be rotated in the chamber 17 from their position underlying the retention members 18, as shown in FIG. 6, to the position shown in FIG. 7 with the straight sides 28 of the stem parallel to the inner side edges 19 of the retention members, whereupon the stem is free and clear to be withdrawn from the nozzle body without any hindrance.

To assemble the nozzle tip 21 into the nozzle body 10 the stem 22 must be related to the nozzle body such that the stem portions 22 may be inserted into the body with the straight stem sides 28 between the side edges 19 of the retention members 18 and the recessed arcuate sections 26 disposed for entry into the second chamber 17. The tip 21 is then pressed into the body 10, compressing the seal member 16 sufficiently to enable the arcuate sections 26 to reach a point below the level of the undersides 20 of the retention devices 18. At this point the arcuate sections can be rotated in the cylindrical chamber 17 to bring the recesses 27 under the retention members where the stem is released under the biasing action of the seal, whereupon it springs back to engage the arcuate sections under the retainers 18 with the stem confined against rotative movement by the alignment of the straight side walls of the recesses 27 in parallel opposed relation to the side edge faces 19 of the retainers. Thus, the tip 21 is securely held in the nozzle body against rotation, or axial movement outwardly by the relative engagement between the recessed arcuate sections 26 and the retention members 18 and under the biasing action of the combination seal member 16.

CONCLUSION

From the foregoing, it will be seen that a quick disconnect nozzle has been provided that eliminates any need for a separate compression spring between the nozzle tip and nozzle body and incorporates a single member that functions both as a sealing member and as a biasing force to maintain an operative relationship between the two parts.

What is claimed is:

1. A quick disconnect coupling comprising first and second coupling members each having an internal fluid passageway, said coupling members being selectively engageable with each other and at least one of said members being adapted for connection to a source of fluid so as to permit fluid transfer through said passageways, one of said coupling members defining an internal chamber having an annular seat at one end thereof, an annular sealing member positioned in said chamber with one end thereof disposed against said annular seat, said sealing member having an inwardly bowed portion intermediate its ends defining an annular space between the outer periphery of said sealing member and said chamber, the other of said coupling members having an annular end that is engageable with the other end of said sealing member and positionable into said chamber for axially compressing the sealing member between said annular end and annular seat while forcing said bowed section radially inwardly to accommodate such compression, and means for retaining said coupling members in said sealing member compressing relation whereby said sealing member forms a fluid seal between said annular end and annular seat and upon an increase in fluid pressure within said coupling member passageways said bowed sealing member portion is forced radially outwardly causing an increase in axial sealing pressure between said sealing member and said annular seat and annular end.

2. The coupling of claim 1 in which said bowed sealing member portion is disposed centrally between the ends thereof.

3. The coupling of claim 1 in which said annular end of said coupling member is formed with a protruding sealing ring that is engageable with the end sealing member.

4. The coupling of claim 1 in which said coupling member retaining means includes locking sections extending radially outwardly of said other coupling member, and said one coupling member is formed with a recess for receiving the locking sections of the other coupling member and upon relative rotation of said coupling members captively retaining said locking sections with said coupling members in sealing member compressing relation.

5. The coupling of claim 1 in which said one coupling member is a spraying tip having an inlet stem at one end and a spray head at the other end, and said other coupling member is a nozzle body adapted for operatively receiving said spray tip stem.

6. The coupling of claim 5 in which said chamber is formed in said nozzle body and said annular coupling member end is formed on the end of said stem.

7. The coupling of claim 5 in which said retaining means includes locking means disposed on said stem, said locking means having a plurality of arcuate sections extending radially outwardly from said stem, said nozzle body defining a recess at the end thereof for receiving said arcuate sections and upon relative rotation of said stem captively retaining said arcuate sections with said coupling members in sealing member compressing relation.

* * * * *